Oct. 12, 1965  E. D. WILKERSON  3,211,410
SUPPORT FOR MOUNTING ON VEHICLE WHEELS
Original Filed March 9, 1955
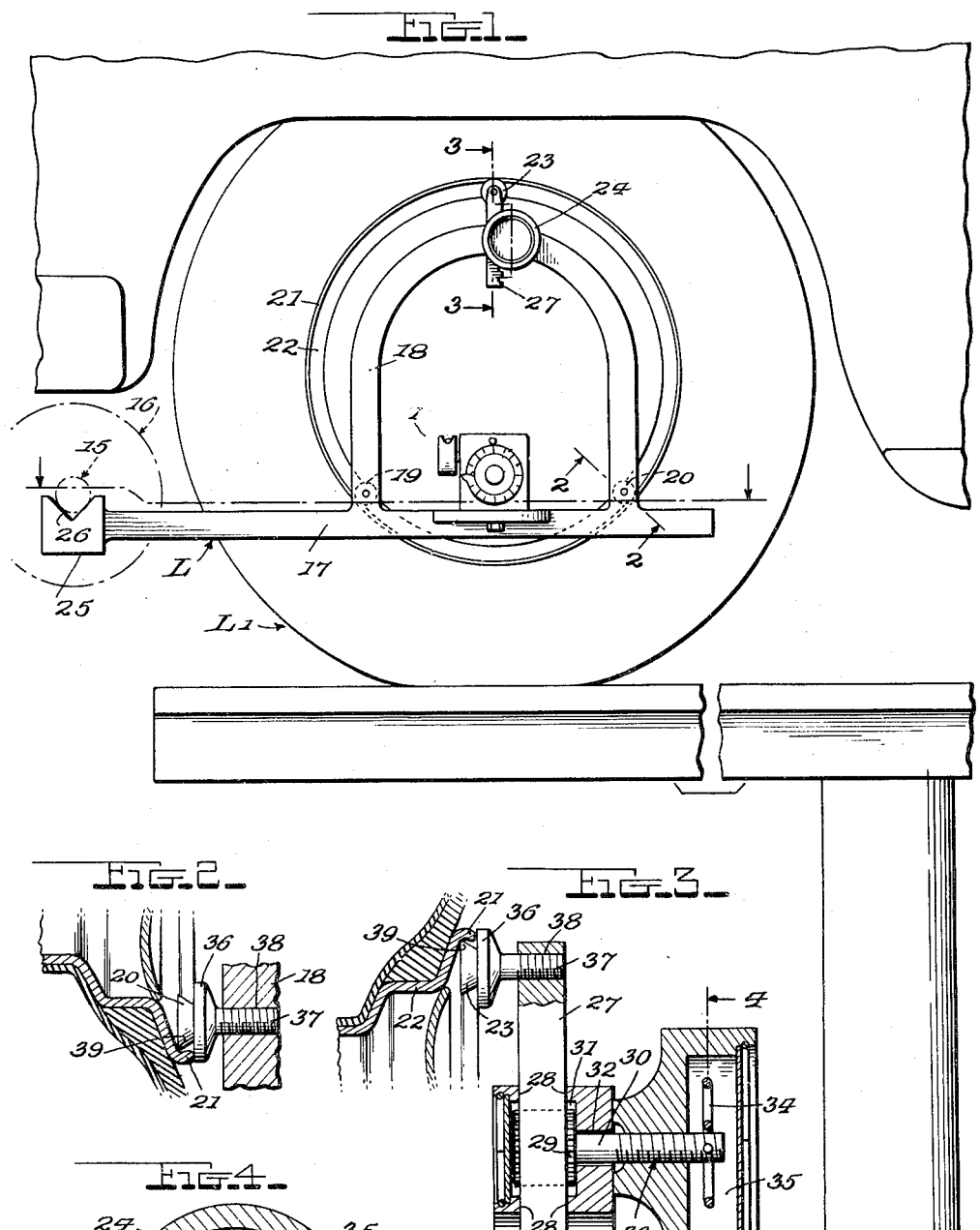
INVENTOR.
Edward D. Wilkerson
BY
Mason, Porter, Diller & Stewart
attys.

United States Patent Office 3,211,410
Patented Oct. 12, 1965

3,211,410
SUPPORT FOR MOUNTING ON
VEHICLE WHEELS
Edward D. Wilkerson, 280 E. Northfield Road,
Livingston, N.J.
Original application Mar. 9, 1955, Ser. No. 493,106.
Divided and this application Oct. 15, 1962, Ser. No. 230,551
6 Claims. (Cl. 248—205)

This invention relates to the testing of the front wheels of motor vehicles to check wheel alignment; and it embodies a novel support which may be readily and securely attached to a vehicle wheel and quickly removed therefrom.

The apparatus is of the general type in which a sighting device and a target are cooperatively mounted on the vehicle front wheels respectively, scales on the target being readable by sighting through the sighting device. An apparatus of this general type is disclosed in my U.S. Patent No. 2,689,403 of September 21, 1954, over which the present invention constitutes an important simplification and improvement.

This application is a division of my copending application Serial No. 493,106, filed March 9, 1955, now Patent No. 3,081,546, issued March 19, 1963.

A primary object of this invention is to provide new and improved means for fixedly mounting the supports for the sighting device and target upon the vehicle wheels, said mounting means including three elements to engage the inner periphery of the wheel rim lip at circumferentially spaced points, two of said elements being fixed while the third is adjustably mounted and provided with a convenient knob or the like for applying and releasing it.

Another object is to make novel provision whereby rotation of the aforesaid knob or the like will first force the adjustably mounted rim-lip-engaging element into tight engagement with the rim lip and will then lock said element.

A further object is to provide the rim-lip-engaging elements of novel form to insure proper positioning of the two supports with respect to the wheel rims and to insure anti-slipping engagement of said elements with the lips of the rims.

A preferred means for attaining the desired ends is shown in the accompanying drawings.

FIGURE 1 is a side elevation showing the left wheel-engaging support which is used in mounting either the sighting device or the target upon the left front wheel of a vehicle, the latter being shown upon a hoist.

FIGURE 2 is a detail sectional view on line 2—2 of FIGURE 1 showing one of the fixed rim-lip-engaging elements.

FIGURE 3 is a vertical sectional view on line 3—3 of FIGURE 1 showing the adjustably mounted rim-lip-engaging element and its operating means.

FIGURE 4 is a vertical sectional view on line 4—4 of FIGURE 3.

The construction shown in the drawings will be rather specifically described, but it is to be understood that variations may well be made within the scope of the invention.

Two frames, a left frame L and a right frame (not shown), are provided to be mounted at the outer sides of two front wheels, a left wheel L¹ and a right wheel (not shown), of a motor vehicle, to interchangeably mount a sighting device 15 and a target 16 upon said wheels, in cooperable relation with each other. Both frames are of the same construction and a description of one (L) will therefore suffice.

This frame L comprises a horizontal bar 17 and an arched bar 18 over the rear portion of said horizontal bar, the legs of said arched bar being suitably joined to said horizontal bar. The inner sides of these legs are provided with two fixed mounting elements 19 and 20 respectively, to engage the lip 21 of the wheel rim 22. At the upper end of the arched bar 18, a third mounting element 23 is adjustably connected with said bar 18 for engagement with the lip 21. A knob or operating member 24 is so associated with the adjustably mounted element 23 as to be usable for moving this element 23 to and from engagement with the rim lip 21 and for locking said element 23 in lip-engaging position, as hereinafter described. Thus, the frame L may be quickly and easily secured to the wheel.

The horizontal bar 17 is relatively short compared to the more or less corresponding "posts" of the patented structure above discussed and said bar 17 is preferably of only such length as to extend forwardly under the front bumper and adjacent fender portions of a motor vehicle when the frame L is mounted on the wheel. The front end of this bar 17 is provided with an elongated head 25. This head is rigidly joined to the front end of the bar 17 and disposed horizontally at a right angle to said bar 17. The upper side of the head 25 is formed with a longitudinal V-groove 26 providing a seat for accurately supporting either the sighting device 15 or the target 16, as more fully explained later.

It was stated above that the knob 24 was operable to move the lip-engaging element 23 into and from engagement with the rim lip 21 and to lock said element in lip-engaging position. The novel structure by means of which this is made possible, will now be described.

The element 23 is secured to the upper end of a short rack bar 27 (FIGURES 1 and 3), said rack bar being slidably mounted in a guideway 28 extending through the upper end of the arched bar 18. A pinion 29 meshes with the teeth of the rack bar 27 and is secured to one end of a short shaft 30. The bar 18 is recessed at 31 to receive the pinion 29 and is formed with a bearing opening 32 through which the shaft 30 extends. The knob or operating member 24 is rather loosely threaded at 33 upon the shaft 30, and a spring 34 establishes a yieldable driving connection from said knob to said shaft, said spring being preferably of spiral form and being housed in a recess 35 in the knob 24.

Turning of the knob 24 to the left causes the spring 34 to turn the pinion shaft 30 in a direction to lower the rack bar 27, thereby lowering the lip-engaging element 23. Turning of the knob 24 to the right causes the spring 34 to drive the pinion shaft 30 in a direction to raise the rack bar 27. This movement firmly engages the element 23 with the rim lip 21 and also insures similar engagement of the lower elements 19 and 20 with said lip. As soon as the upward movement of the rack bar 27 has been arrested, further turning of the knob 24 (permitted by the spring 34) will cause said knob to act as a nut and lock the shaft 30 in the position to which it has been turned, thus insuring that the elements 19, 20 and 23 shall remain solidly engaged with the rim lip 21.

Each of the elements 19, 20 and 23 is preferably of frusto-conical form (FIGURES 2 and 3) with an integral peripheral flange or shoulder 36 and a mounting stud 37 at its smaller end. The stud 37 is threaded tightly into an opening 38 in the bar 18 or rack bar 27 as the case may be.

By forming the elements 19, 20 and 23 as shown, the flanges or shoulders 36 will abut the edge of the rim lip 21 to locate the frame L in proper relation with the plane of the wheel, and the sharp edges 39 of said elements will bite into said lip sufficiently to prevent slipping. When the lip-engaging portions of the edges 39 have become dulled by repeated use, the studs 37 may be turned sufficiently to present other portions of said edges for use.

From the foregoing, it will be seen that novel and advantageous provision has been made for attaining the desired ends. However, attention is again invited to the possibility of making variations within the scope of the invention.

I claim:

1. In a vehicle wheel alignment testing means, a supporting member for disposition at the outer side of a vehicle wheel, said supporting member having a guideway for disposition radially of the wheel, a rack bar slidable in said guideway and having a rim-lip-engaging element, a shaft rotatably mounted on said supporting member and extending transversely of said rack bar, said shaft having a pinion engaging said rack bar, said shaft having a threaded end projecting beyond said supporting member, an operating knob loosely threaded on said threaded shaft end, and a yieldable driving connection from said knob to said shaft; whereby rotation of said knob will project said rack bar to engage said rim-lip-engaging element with the rim lip and said knob may then be turned further to act as a clamping nut for locking said shaft.

2. A structure as specified in claim 1, said yieldable driving connection consisting of a spiral spring connected at one end to said knob and at its other end to said shaft, said knob having a recess in which said spring is received.

3. In a wheel alignment testing means, a supporting frame for disposition at one side of a vehicle wheel, a plurality of rim-lip-engaging elements projecting laterally from said frame to engage the lip of the wheel rim at circumferentially spaced points, and means for shifting at least one of said elements to and from operative position, each of said elements having a shoulder to abut the edge of the rim lip, each of said elements also having a sharp edge to bite into the periphery of the rim lip, said shoulder and sharp edge of each lip-engaging element being of circular form about a common axis, each of said lip-engaging elements being mounted for rotative adjustment upon said axis.

4. In a wheel alignment testing device, a supporting frame for disposition at the outer side of one wheel of a vehicle, said frame having a horizontally extending portion and an upstanding portion, two horizontally spaced rim-lip-engaging elements projecting laterally from the lower portion of said frame, a projectable and retractable member mounted on the upper end of said upstanding portion of said frame, a third rim-lip-engaging element projecting laterally from said projectable and retractable member, and an operating member, means operatively connecting said operating member to said projectable and retractable member for moving said third rim-lip-engaging element into and out of engagement with a rim of said wheel, said means including resilient means for limiting the force applied to said rim by said third rim-lip-engaging element.

5. In a wheel alignment testing means, a supporting member for disposition at the outer side of a vehicle wheel, a projectable and retractable member mounted on said supporting member and having a rim-lip-engaging element, operating and locking means for said projectable and retractable member, said operating and locking means having a single actuating handle mounted on said supporting member, resilient means connecting said actuating handle to said operating and locking means for transmitting operating forces from said actuating handle to said projectable and retractable member and for automatically limiting the magnitude of said operating forces.

6. In a wheel alignment testing means, a supporting frame for disposition at one side of a vehicle wheel, a plurality of rim-lip-engaging elements projecting laterally from said frame to engage the lip of the wheel rim at circumferentially spaced points, force applying means for shifting at least one of said elements to and from operative position, each of said elements having a shoulder to abut the edge of the rim lip, each of said elements also having a sharp edge to bite into the periphery of the rim lip, said force applying means including spring means for automatically limiting the force applied by said force applying means.

References Cited by the Examiner

UNITED STATES PATENTS 2,601,262    6/52    Carrigan _____ 33—46

FOREIGN PATENTS 612,699    11/48    Great Britain.

CLAUDE A. LE ROY, *Primary Examiner.*

FRANK P. ABBOTT, *Examiner.*